Jan. 22, 1952     J. C. WIDMAN ET AL     2,583,349
ADJUSTABLE VEHICLE SEAT

Filed Feb. 21, 1947     2 SHEETS—SHEET 1

J. C. WIDMAN
W. B. SCHUEREN
*INVENTORS.*

BY

ATTORNEYS.

Jan. 22, 1952  J. C. WIDMAN ET AL  2,583,349
ADJUSTABLE VEHICLE SEAT
Filed Feb. 21, 1947  2 SHEETS—SHEET 2
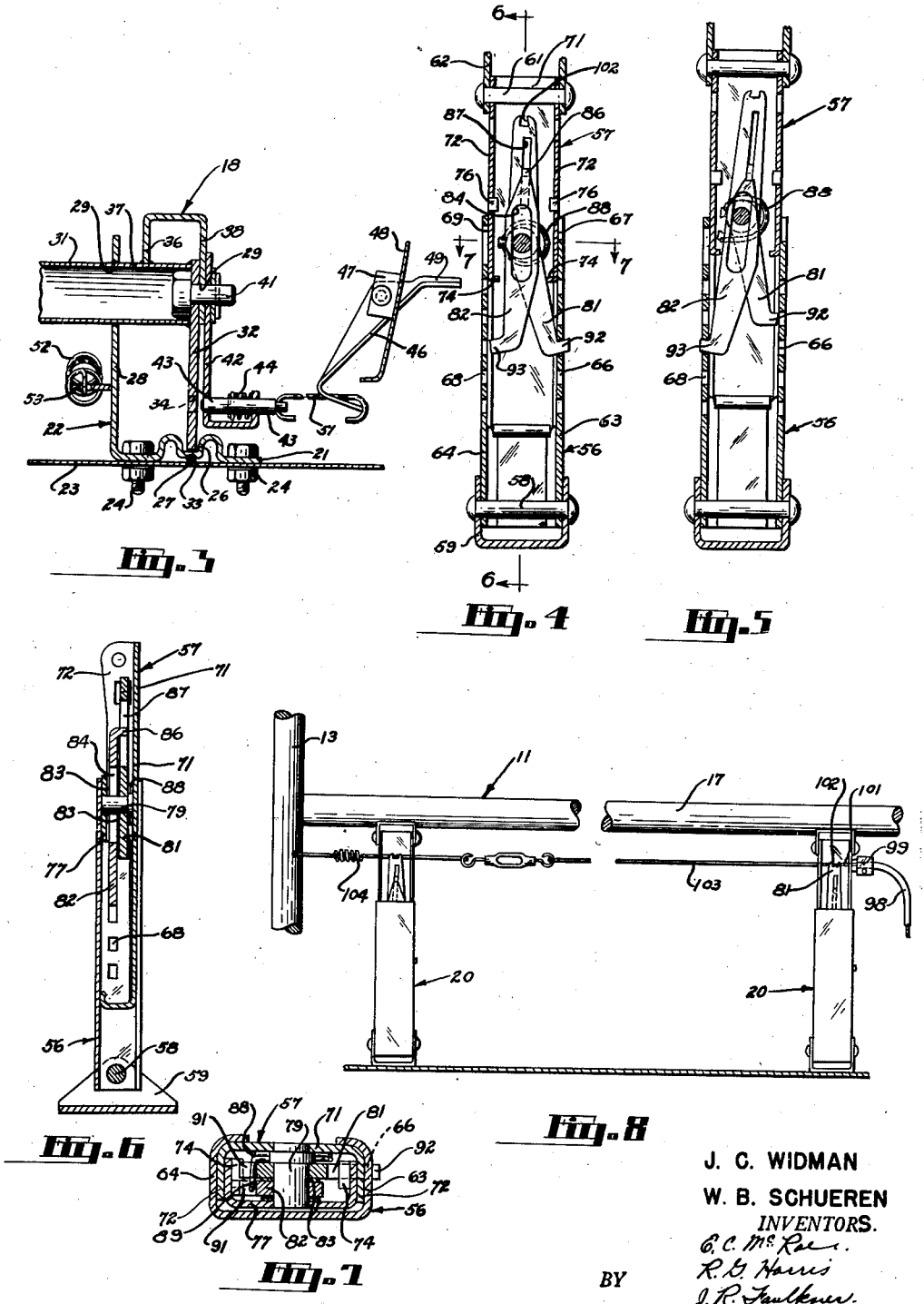
J. C. WIDMAN
W. B. SCHUEREN
INVENTORS.
BY
ATTORNEYS.

Patented Jan. 22, 1952

2,583,349

UNITED STATES PATENT OFFICE 2,583,349

ADJUSTABLE VEHICLE SEAT

John C. Widman, Royal Oak, and William B. Schueren, Detroit, Mich., assignors to Ford Motor Company, Dearborn, Mich., a corporation of Delaware Application February 21, 1947, Serial No. 730,034

5 Claims. (Cl. 155—14)

This invention relates generally to adjustable vehicle seats and has particular reference to vehicle seat constructions which include means for effecting vertical adjustment of the seat.

The front seats of motor vehicles are conventionally mounted for adjustment longitudinally of the vehicle so that the seat can be adjusted relative to the steering wheel and to the foot operated controls to accommodate various drivers. This longitudinal adjustment is usually obtained by mounting the seat upon co-operating slide and rails, by pivotally mounting the seat upon short links which in turn are pivotally connected to the floor of the vehicle, or by providing sector and rack assemblies between the seats and the floor. No means are provided, however, for adjusting the seat in a vertical direction, although in the pivoted link type of mounting mentioned above, a limited variation in the vertical height of the seat is obtained by reason of the angular movement of the links as they are adjusted longitudinally. Various constructions have heretofore been proposed to effect a vertical adjustment of the seat independently of the longitudinal adjustment thereof, but in general these proposed constructions have been extremely complicated and not at all suitable for incorporation in massproduced automobiles. There thus remains a definite need for a vehicle seat which can be adjusted vertically as well as longitudinally, and which can be designed for automobile production without entailing substantially increased costs. The need for an independent vertical adjustment of the driver's seat is emphasized by the recent trend in automobile body construction and design, in which the vehicle hood is relatively high and the roof or over-all height of the vehicle relatively low. A vertically adjustable seat would therefore be extremely valuable for short persons, since the seat could be readily elevated to enable them to obtain clear vision over the steering wheel and hood; and it would be equally useful for tall persons by permitting them to lower the front seat to provide greater head clearance.

The foregoing problem is solved by the present invention which provides a vehicle seat incorporating means for effecting a vertical adjustment thereof. The adjusting mechanism is simple, easily operated, and positive in operation. Furthermore, the vertical adjustment is entirely independent of the longitudinal adjustment of the seat. In other words, the seat can be adjusted longitudinally without effecting the vertical adjustment, or, alternatively, the seat may be adjusted vertically without disturbing the longitudinal position. Despite this independent operation of the two types of adjustment of which the seat is capable, the two supporting mechanisms cooperate with each other in that the vertically adjustable supporting mechanisms form swinging links permitting longitudinal adjustment of the seat, and the horizontally adjustable supporting mechanism provides a fulcrum or pivotal axis about which the seat may be tilted to effect the vertical adjustment.

Another object of the present invention is to provide a vertically adjustable seat which can be adjusted both up and down with a minimum of effort on the part of the driver while remaining in seated position. The vertical adjustment is effected simply by operating the control lever and then leaning forward if the seat is to be raised or leaning back if the seat is to be lowered.

Another object of the inventtion is to provide a mechanism for adjusting a vehicle seat in a vertical direction, including means providing for step-by-step adjustment between a plurality of vertically spaced positions.

Other objects and advantages of the present invention will be more apparent as this description proceeds, particularly when considered in connection with the accompanying drawings, in which:

Figure 3 is a vertical cross sectional view, taken substantially on the plane indicated by the line 3—3 of Figure 2.

Figure 4 is a cross sectional view of the vertically adjustable rear support, taken substantially on the plane indicated by the line 4—4 of Figure 2.

Figure 5 is a cross sectional view similar to Figure 4, but illustrating the mechanism in the operation of being adjusted vertically upward.

Figure 6 is a vertical cross sectional view, taken substantially on the plane indicated by the line 6—6 of Figure 4.

Figure 7 is a horizontal cross sectional view, taken substantially on the plane indicated by the line 7—7 of Figure 4.

Figure 8 is a front elevational view, illustrating the interconnections between the vertically adjustable supports at opposite sides of the seat.

Figure 1:
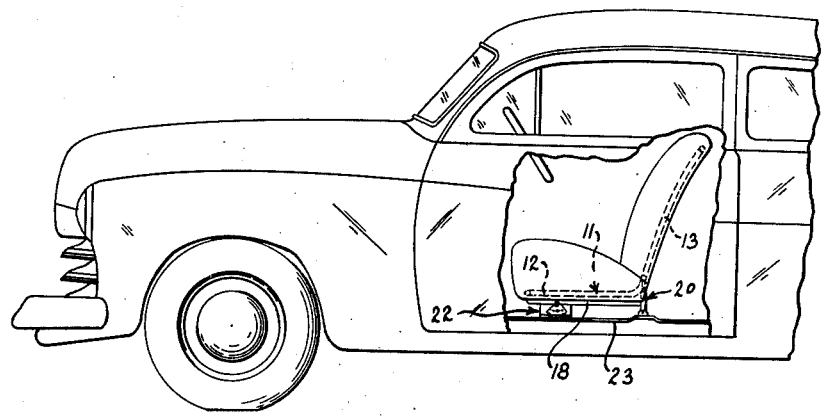
Figure 1 is a fragmentary side elevational view of an automobile with a portion of the front door broken away to show the adjustable front seat thereof.

Referring now more particularly to the drawings, the reference character 11 indicates the tubular frame of the front seat of a motor vehicle. The frame comprises side members 12 having upwardly extending portions 13 forming the back of the seat, the side members at opposite sides of the seats being joined and braced by transversely extending tubular members 14, 16 and 17. The transverse tubular members 14 and 16 are secured to the forward and rearward ends respectively of a pair of longitudinally extending support channels 18 positioned adjacent opposite sides of the seat. Inasmuch as the supporting and adjusting mechanisms at opposite sides of the seat are identical, with the exception that manually operated adjusting levers are provided only at the driver's side of the seat, the following description will, in general, be limited to the construction at the driver's side of the seat.

Figure 2:
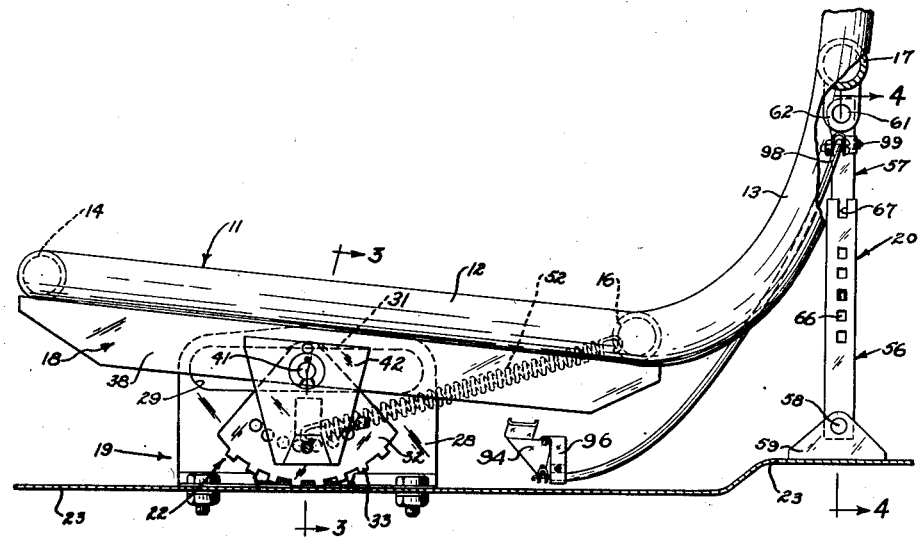
Figure 2 is a side elevational view of the front seat on a larger scale.

As best seen in Figure 2, each side of the front seat is supported upon a front supporting assembly 19 and a rear supporting assembly 20. The front supporting assembly 19 will be described first. The horizontal lower flange 21 of the generally L-shaped base plate 22 is bolted to the floor 23 of the vehicle by bolts 24. The lower flange 21 of the base plate is provided intermediate its side edges with a longitudinally extending channel 26, which is formed with a plurality of longitudinally spaced notches 27, forming a rack. The upright flange 28 of the base plate 22 is provided with a longitudinally extending slot 29, adapted to receive and guide the end of the cross tube 31, extending between the front supporting assemblies 19, at opposite sides of the seat. A flat plate 32, formed in the shape of a quadrant or sector, is welded to the end of the cross tube 31 and is provided with a series of teeth 33 along its lower edge, and also with an arcuate series of adjusting holes 34, for a purpose which will appear later. It will be apparent that with the ends of the cross tubes 31 extending through the longitudinally extending slot 29 in the upright flange of the base plate the teeth 33 upon the sector 32 will be in engagement with the notches 27, forming the rack in the lower flange of the base plate. Inasmuch as the teeth upon the sector are formed at a common radius from the axis of the cross tube, the sector is adapted to roll longitudinally along the rack formed in the base plate, causing the cross tube to move longitudinally in the slot 29. With the cross tube 31 connected to the support channel 18 of the seat, it will be seen that this rolling movement of the sector results in longitudinal movement of the seat.

That the support channel 18 is carried by the cross shaft 31 will be seen from an examination of Figures 2 and 3. The inner leg 36 of the support channel 18 is formed with a notch 37 fitting over the cross tube, while the outer leg 38 is provided with a small hole 39, through which extends the shank of a bolt 41, the head of which is welded in the outer end of the cross tube 31. In this manner the cross tube is pivotally mounted in the support channel. During this longitudinal adjustment of the vehicle seat by the front supporting assemblies 19, the rear supporting assembly 20 functions as a swinging link to support the rearward portion of the seat and to permit the longitudinal movement thereof.

Means are provided for locking the seat in any one of a plurality of longitudinal positions. This means comprises a channel shaped bracket 42, apertured adjacent its upper end to slip over the pivot pin 41 and preferably spot-welded to the outer leg 38 of the support channel 18. An adjusting pin 43 is reciprocally mounted in aligned openings in the lower portion of the bracket 42 and is normally urged by a coil spring 44 toward the plate or sector 32, so that the inner end of the adjusting pin engages one of the holes 34 in the sector, to lock the latter against rotation, and to thus lock the seat in any one of a number of selected longitudinal positions. The adjusting pin 43 is released to permit longitudinal adjustment of the seat by manual operation of an adjustment lever 46 pivotally mounted upon flanges 47 bent inwardly from the side cover plate 48 of the seat. The lever is provided with a tab 49 extending through the cover plate in position for operation by the driver, and the lever is connected to the adjusting pin 43 by means of a connecting link 51. To assist in adjusting the seat longitudinally, a return spring 52 is interconnected between the transverse extending member 16 of the seat and a flange 53 extending inwardly from the upright flange 28 of the base plate 22.

Although the above-described front supporting assembly 19 is generally conventional in construction, it is important to note that the assembly is located, not at the forward edge of the seat, but at a point intermediate the forward and rearward edges of the seat. In addition to providing for longitudinal adjustment, the front assembly also provides a transversely extending pivotal axis or fulcrum about which the seat may be tilted to effect operation of the vertically adjustable rear supporting assembly 20 in the manner to be more fully described hereinafter.

One rear supporting assembly 20 is provided at each side of the front seat adjacent the rearward edge thereof. Each of the rear supporting assemblies is identical in construction, with the exception that the assembly at the left of the driver's side is operated by a manually operated lever located adjacent the driver's position, while the assembly at the right of the seat is interconnected with the left-hand assembly for operation therewith as a unit. As best seen in Figures 4, 5, 6 and 7, each rear supporting assembly comprises a lower channel 56 and an upper channel 57 telescopically engaged with each other. The lower channel 56 is pivotally connected by means of a pin 58 to a lower bracket 59 mounted upon the vehicle floor 23; while the upper channel 57 is pivotally connected by means of a pin 61 to the upper bracket 62, the latter being fastened to the rear tubular cross member 17 of the seat frame.

It will be clearly seen from an examination of Figure 7 that the sides 63 and 64 of the lower channel 56 are bent inwardly adjacent their rearward edges to form a guideway for the upper channel 57, the latter being slidably received within the lower channel 56. A series of adjusting notches 66 are provided in the left side 63 of the lower channel, the notches being of equal size and equally spaced vertically with the exception of the upper notch 67 which is somewhat longer in vertical extent. A similar series of adjusting notches 68 are provided in the right side 64 of the lower channel, the notches 68 being in horizontal alignment with the notches 66 on the opposite side of the channel but being offset slightly in a forward direction. An upper notch 69 is provided at the upper end of the side 64 and is so arranged for co-operation with the upper notch 67 formed in the left side to facilitate the assembly and disassembly of the upper and lower channels.

The upper channel 57 comprises a back 71 and side flanges 72. The lower portions of the side flanges 72 are cut away and are bent inwardly to form tabs 74, which, together with tabs 76 bent inwardly from the side flanges 72, support a bracket 77 upon the upper channel 57. The bracket 77 is channel shaped, as best seen in Figure 7, and is formed with projections extending upwardly from its side flanges. In assembly, the projections are inserted beneath the upper tabs 76, and the lower portion of the bracket is supported upon the lower tabs 74. When the upper and lower channels are assembled together in telescopic arrangement, the bracket 77 is securely held in place upon the upper channel 57, but can be readily disassembled therefrom by removing the upper channel from the lower channel and pulling the lower portion of the bracket 77 outwardly. This facilitates maintenance for replacement of any of the parts of the assembly, should such be necessary.

A pivot pin 79 extends between the back of the upper channel 57 and the upper channel bracket 77 and pivotally supports a primary latch 81 and a secondary latch 82. The primary and secondary latches are separated from each other and from the bracket 77 by washers 83. It will be seen from Figures 4 and 6 that the primary latch 81 is mounted upon the pivot pin 79 for pivotal movement only, while the secondary latch 82 is mounted upon the pivot pin for sliding as well as pivotal movement. An elongated slot 84 in the secondary latch permits this sliding movement. The upper portion of the secondary latch 82 is bent rearwardly to form a finger 86, which is slideably received within the elongated slot 87 formed in the upper portion of the primary latch 81. This insures simultaneous pivotal movement of the primary and secondary latches. Thus it will be seen that while the secondary latch is mounted for sliding movement relative to the primary latch and also relative to the upper channel 57, both latches swing together about the pivot pin 79 regardless of their relative vertical positions. A return spring 88 is provided to maintain the secondary latch 82 in a central or neutral position. The return spring 88 encircles the pivot pin 79 between the primary latch 81 and the back 71 of the upper channel, and the ends 89 of the spring are bent to rest against opposite sides of tabs 91 of similar shape, extending outwardly from the midportion of the primary and secondary latches 81 and 82. Relative vertical movement between the primary and secondary latches results in expanding the return spring 88, so that upon the release of the secondary latch it will return to the central or neutral position shown in Figure 4.

The lower ends of the primary and secondary latches 81 and 82 are formed with hook portions 92 and 93, respectively. The hook-shaped end 92 of the primary latch 81 is of a size to fit into the adjusting notches 66 formed in the side 63 of the lower channel, while the hook-shaped end 93 of the secondary latch 82 is adapted to fit into the adjusting notches 68 formed in the opposite side 64 of the lower channel. It will be noted that while the upper portions of the primary and secondary latches are substantially in alignment with each other, the lower portions are divergent so that the hook-shaped ends 92 and 93 are spaced from each other a predetermined distance. This distance is calculated so that while the hook-shaped end 92 of the primary latch is engaged in one of the adjusting notches 66, the hook-shaped end 93 of the secondary latch will be disengaged from the adjusting notch 68 at the opposite side of the lower channel. Conversely, when the hook-shaped end of the secondary latch is inserted through one of the adjacent notches 68, the end of the primary latch is free from engagement with the opposite side of the lower channel.

As seen in Figures 2 and 8, the primary latch 81 of the rear-supporting assembly 20 at the driver's side of the front seat is operated by a manually operated lever 94 which is pivotally mounted upon a clamp 96 secured to the side panel or cover plate 48 of the front seat. The conduit 98 of a Bowden cable assembly is secured at one end to the clamp 96 and at its opposite end to a clamp 99 riveted to the upper channel 57 of the rear-supporting assembly 20. A flexible wire element 101 extends through the conduit and is attached at one end to the lever 94 and at its opposite end to the upper portion of the primary latch 81 by means of a notch 102, formed in the latter. A connecting wire 103 formed with hook-shaped ends extends between the notch 102 at the upper end of the primary lever in the rear-supporting assembly at the driver's side of the seat to a corresponding notch formed in the primary latch of the rear-supporting assembly at the opposite side of the seat. Both primary latches are urged toward their operative position by means of the return spring 104.

*Operation*

The longitudinal adjustment of the seat has heretofore been described in connection with the description of the front-supporting assembly 19. During this longitudinal adjustment, the rear-supporting assemblies 20 function as rigid struts or links pivoted at opposite ends to the vehicle floor and to the seat to permit the necessary longitudinal adjustment. During longitudinal adjustment of the seat, it will be seen that due to the angularity of the movement of the rear-supporting assemblies there is a slight variation in the height of the rearward portion of the seat. This, however, is small, and cannot be controlled independently of the longitudinal adjustment. However, independent vertical adjustment of the rearward portion of the seat is afforded by means of the rear-supporting assemblies. The amount of the vertical adjustment which can be effected is limited only by the length of the upper and lower channels 57 and 56 and the number of adjusting notches 66 and 68 formed in the lower channels. In other words, if a greater vertical adjustment is required, the upper and lower channels can be lengthened and the number of notches increased. Thus it is possible to secure a vertical adjustment of the seat to provide the maximum comfort and vision for drivers of various types.

Vertical adjustment of the seat is accomplished by a step-by-step movement, with the amount of each adjustment being equal to the distance between adjacent notches 66 or 68. In the normal fixed riding position of the seat, the return spring 104 acts upon the primary latches 81 to swing the latter to the position shown in Figure 4 in which a rigid connection is formed between the upper and lower channels 57 and 56, respectively. When it is desired to move the upper and lower channels relative to each other to effect a vertical adjustment of the seat, the manually operated lever 94 is actuated by the driver and, through the conduit 98 and wire 101, swings the primary latch 81 in a clockwise direction to a position in which the hook-shaped end 92 of the primary latch is disengaged from the adjacent notch 66. At the same time, the secondary latch 82, which pivots with the primary latch as a unit, is swung to a position such that the lower hook-shaped end 93 is inserted into the corresponding notch 68 in the opposite side of the lower channel. At the same time, of course, the primary latch and secondary latch of the rear-supporting assembly of the opposite side of the seat are simultaneously operated by means of the connecting wire 103. In this position of the latches, the seat is in readiness to be adjusted either upwardly or downwardly as desired.

With the latches in the position mentioned above, to elevate the rearward portion of the seat, it is only necessary for the occupant or driver to lean forward, so that his weight is shifted ahead of the front-supporting assembly 19. As previously mentioned, the cross tube 31 of the front-supporting assembly forms a pivotal axis extending transversely of the seat, and the forward shift of the occupant's weight results in swinging the seat frame about this axis and, consequently, raising the rearward portion thereof. Due to the slotted connection 84 between the secondary latch 82 and the latch pivot pin 79 carried by the upper channel, the upper channel and its associated mechanism are free to move upwardly to the position shown in Figure 5. It will be noted that in this position the primary latch, which is carried by the upper channel, has moved upwardly so that its lower hook-shaped end 92 is in alignment with the notch 66 just above the notch with which it was previously engaged. It is now only necessary to release the operating lever 94, permitting the return spring 104 to swing the primary latch in a counterclockwise direction to engage its lower hook-shaped end 92 with the adjacent notch 66. This frees the lower hook-shaped end 93 of the secondary latch 82 from its adjacent notch 68, and the latch return spring 88 returns the secondary latch to its central or neutral position in which its lower hook-shaped end 93 is opposite the hook-shaped end 92 of the primary latch. If further adjustment in an upward direction is desired, the same operation is repeated, the driver again operating the lever 94 and leaning forward in the seat to index the latches upwardly.

In a similar manner, the seat can be adjusted downwardly by operating the lever 94 and leaning backward, so that the occupant's weight is shifted rearwardly of the axis provided by the cross tube 31, resulting in moving the upper channel 57 and the primary latch 81 carried thereby downwardly until the lower hook-shaped end 92 of the primary latch is in alignment with the next lower notch 66. Releasing the actuating lever again causes the return spring 104 to spring the latches in a counterclockwise direction to move the hook-shaped end 92 of the primary latch into engagement with the new notch 66 and to simultaneously disengage the lower end of the secondary latch from its notch 68, after which the secondary latch again returns to neutral position in readiness for another adjustment. Thus, the rear-supporting assembly is adapted to be adjusted either upwardly or downwardly in a step-by-step fashion in a simple yet positive manner, and the adjustment can be affected without the necessity of the driver or other occupant leaving the seat.

It will, of course, be understood that the vertically adjustable supporting assembly of the present invention can be used with other types of seat-supporting mechanisms besides that shown in the drawing, and that is adapted for other purposes as well.

It will also be understood that the invention is not to be limited to the exact construction shown and described, but that various changes and modifications may be made without departing from the spirit and scope of the invention, as defined in the appended claims:

We claim:

1. An extensible link for adjustably supporting a seat frame upon the floor of a motor vehicle, comprising, upper and lower telescoping members pivoted respectively to said seat frame and to the floor of the vehicle, series of spaced notches formed in opposite sides of one of said members, a pair of latches pivotally mounted upon the other of said members and each adapted to engage one of said series of notches, means connecting said latches with each other for simultaneous pivotal movement so that when one of said latches engages an adjacent notch the other of said latches is disengaged from its series of notches, and means permitting relative sliding movement between said latches to permit said latches to be moved in a step-by-step manner along said series of notches to extend or contract said telescoping members.

2. An extensible link for adjustably supporting a seat frame upon the floor of a motor vehicle, comprising, upper and lower telescoping members pivotally mounted respectively to said seat frame and to the floor of said vehicle, a primary latch pivotally mounted upon one of said members and engageable with the other of said members to lock said members together in various relative positions, actuating means connected to said primary latch to release the latter and permit relative movement between said members, and a secondary latch pivotally and slidably mounted upon the same member which supports said primary latch and permitting the predetermined sliding movement between said telescoping members in either direction during the interval in which said primary latch is inoperative.

3. An extensible link for adjustably supporting a seat frame upon the floor of a motor vehicle, comprising, upper and lower telescoping members pivotally mounted respectively to said seat frame and to the floor of said vehicle, series of equally spaced notches formed in opposite sides of one of said members, a primary latch pivotally mounted upon the other of said members and having one end formed to engage said notches, spring means normally holding said end of said primary latch in engagement with one of said notches, actuating means connected to said primary latch to pivot the latch against the action of said spring to disengage the latch end from said notch, a secondary latch pivotally and slideably mounted upon said last-mentioned member and having one end formed to engage the notches at the side of said first-mentioned member opposite to the side carrying the notches engaged by said primary latch, spring means normally holding said secondary latch in a neutral position in so far as its sliding movement is concerned, and co-operating means between said primary and secondary latches permitting relative sliding movement between the two latches but requiring simultaneous pivotal movement of the two latches.

4. A vehicle seat comprising, in combination, a seat frame, a pivotal support for said seat frame intermediate the front and rear edges thereof, a pair of telescopic members pivoted respectively to the rearward portion of said seat frame and to the floor of said vehicle, and cooperating means on said telescopic members for selectively locking said members in different extended positions to vary the height of said seat frame, said cooperating means comprising a series of notches formed on opposite sides of one of said telescoping members, a primary latch pivotally mounted upon the other of said telescoping members and having a hook-shaped end selectively engageable in one of said series of notches, actuating means connected to the opposite end of said primary latch, a secondary latch pivotally mounted upon said last-mentioned telescoping member and having a hook-shaped end engageable with the other of said series of notches, and cooperating means between said primary and said secondary latches permitting relative sliding movement therebetween but requiring simultaneous pivotal movement of the two latches.

5. A vehicle seat comprising, in combination, a seat frame, a pivotal support for said seat frame intermediate the front and rear edges thereof, a pair of telescopic members pivoted respectively to the rearward portion of said seat frame and to the floor of said vehicle, and cooperating means on said telescopic members for selectively locking said members in different extended positions to vary the height of said seat frame, said cooperating means comprising a series of notches formed on opposite sides of one of said telescoping members, a primary latch pivotally mounted upon the other of said telescoping members and selectively engageable with one of said series of notches, and a secondary latch pivotally and slideably mounted upon said last-mentioned telescoping member and selectively engageable with the other series of notches to permit relative sliding movement between said latches to permit said latches to be moved in a step-by-step manner along said series of notches to extend or contract said telescoping members.

JOHN C. WIDMAN.
WILLIAM B. SCHUEREN.

REFERENCES CITED

The following references are of record in the file of this patent:

UNITED STATES PATENTS

| Number | Name | Date |
| --- | --- | --- |
| 2,124,755 | Simpson et al. | July 26, 1938 |
| 2,132,009 | Ball | Oct. 4, 1938 |
| 2,161,367 | McGregor et al. | June 6, 1939 |
| 2,407,771 | De Rose | Sept. 17, 1946 |